United States Patent [19]

Wagensonner et al.

[11] 4,154,516
[45] May 15, 1979

[54] DIGITAL EXPOSURE-DURATION CONTROL SYSTEM FOR PHOTOGRAPHIC CAMERAS

[75] Inventors: Eduard Wagensonner, Aschheim; Karl Wagner; Friedrich Stumpf, both of Munich, all of Fed. Rep. of Germany

[73] Assignee: AGFA-Gevaert, A.G., Leverkusen, Fed. Rep. of Germany

[21] Appl. No.: 836,853

[22] Filed: Sep. 26, 1977

[30] Foreign Application Priority Data

Sep. 30, 1976 [DE] Fed. Rep. of Germany ....... 2644205

[51] Int. Cl.$^2$ ............................................. G03B 7/08
[52] U.S. Cl. .................................. 354/23 D; 354/29; 354/238
[58] Field of Search .................... 354/23 D, 29, 238

[56] References Cited

U.S. PATENT DOCUMENTS

| | | | |
|---|---|---|---|
| 3,824,608 | 7/1974 | Toyoda | 354/23 D |
| 3,900,855 | 8/1975 | Stempeck | 354/29 |
| 3,995,284 | 11/1976 | Kitaura et al. | 354/23 D |
| 4,040,067 | 8/1977 | Kondo | 354/23 D |

Primary Examiner—Russell E. Adams
Attorney, Agent, or Firm—Michael J. Striker

[57] ABSTRACT

An analog signal whose value is proportional to scene-light intensity is converted into a multi-bit digital signal of corresponding value. A train of clock pulses is generated, having a repetition frequency greater than the reciprocal of the shortest exposure duration to be establishable by the control system. The digital light-intensity signal is continually totalized during the course of an exposure by a clocked totalizer which operates in synchronism with the train of clock pulses and produces during the course of the exposure a multi-bit digital totalized-light signal. A comparator has a first input at which it receives the totalized-light signal and a second input at which it receives a digital total-required-light signal. The latter signal is furnished by an addressable storage which stores a plurality of total-required-light signals of different respective values, corresponding to different exposure programs. A selector operated by the photographer or automatically addresses the addressable memory, causing the latter to furnish to the comparator the total-required-light signal appropriate for the exposure program involved.

13 Claims, 2 Drawing Figures

DIGITAL EXPOSURE-DURATION CONTROL SYSTEM FOR PHOTOGRAPHIC CAMERAS

BACKGROUND OF THE INVENTION

The invention relates to photographic cameras of the type provided with a light-sensitive digital exposure-duration control system including means for measuring a fractional light component proportional to the light incident upon the film in the camera.

SUMMARY OF THE INVENTION

It is a general object of the invention to provide an exposure-duration control system having a digital light-measuring arrangement capable of performing light-measuring and exposure-duration-selection operations for any desired type of shutter-opening and shutter-closing action.

It is another object of the invention to provide an exposure-duration control system of such a design as to be appropriately and optimally realizable in integrated-circuit form.

It is a further object of the invention to provide an exposure-duration control system which can be adjusted to take into account variable exposure parameters, for example film sensitivity, but in a way which does not involve any alteration, and certainly no reduction, in the effective photosensitivity of the photosensitive element(s) employed in the system.

These objects, and others which will become more understandable from the detailed description of the preferred embodiment, can be met, by performing a clocked totalization of a digital light-indicating signal. A light-measuring circuit produces an analog light-indicating signal whose value is indicative of the intensity of the light incident upon the film in the camera. An analog-to-digital converter converts the analog light-indicating signal into a digital light-indicating signal of corresponding value. A pulse generator generates a clock pulse train, whose repetition frequency is greater than the reciprocal of the shortest exposure duration to be establishable by the exposure-duration control system. The digital light-indicating signal is continually applied to a clocked totalizer. The clocked totalizer is operative during the course of an exposure and in synchronism with the pulses of the clock pulse train for continually totalizing the values assumed by the digital light-indicating signal, to produce during the course of the exposure a digital totalized-light signal. The totalized-light signal is applied to a first input of a comparator, the second input of which receives a total-required-light signal from an addressable storage. The addressable storage stores a plurality of different total-required-light signals, each having a different respective value corresponding to a different exposure program. The exposure programs may differ, for example, with respect to the sensitivity of the type of film to be employed. A program selector is operated by the photographer or operates automatically to apply to the addressable storage an address signal identifying the exposure program to be followed. The value of each digital total-required-light signal available from the addressable storage corresponds to the value which the digital totalized-light signal reaches during the course of the respective exposure program, when the total amount of light incident upon the film during the course of the exposure operation has reached the value necessary for the selected exposure program.

Preferably, the analog light-indicating signal is converted into a digital light-indicating signal, and the latter is fed in into the totalizer in synchronism with the clock pulse train.

The values of the total-required-light signal which can be furnished by the addressable storage are inversely proportional to the period of the clock pulse train or, expressed in other words, proportional to the repetition frequency of the clock pulse train. Because of this, the totalizer can simply add the value of the digital light-indicating signal onto the totalized-light signal, in synchronism with the clock pulse train, without the need for a true (i.e., continuous mathematical) integration of the values assumed by the digital light-indicating signal during the course of the exposure operation. When the comparator detects that the bits of the digital totalized-light signal are identical to the bits of the digital total-required-light signal, it transmits a signal to an exposure-terminating means, which is operative for terminating the exposure operation in dependence upon at least this comparator output signal.

If the period of the clock pulse train is made considerably shorter than the shortest exposure duration to be establishable by the exposure-duration control system, a very precise and accurate control of exposure duration or shutter operation can be achieved, even for short-lasting exposures.

Integrating capacitors of the type conventional in the prior art for integrating a scene-light-intensity signal are bulky and space-consuming and, because they are not realizable in integrated-circuit form, must be connected onto the integrated-circuit components of prior-art integrated-circuit exposure control systems. The present invention eliminates the need for such capacitors.

The use of an addressable storage capable of furnishing total-required-light signals of different values in dependence upon the exposure-program selected creates an enormous capacity for taking into account variable exposure parameters, such as film sensitivity. Furthermore, when variable exposure parameters are taken into account in this way, there need be no alteration, and certainly no reduction, in the effective sensitivity of the photosensitive element(s) employed in the control system. For example, it is not necessary to compensate for exposure parameter changes by attenuating the light incident upon the photosensitive element(s) or by scaling-down the light-dependent signal produced by the photosensitive element(s).

When performing flash exposures using a flash-bulb flash unit, it is advantageous to set the exposure duration to a value corresponding to the burn-out time of the flash bulb. To eliminate the possibility of incorrect exposure durations when performing flash exposures, the mounting of the flash unit on the camera closes a flash-unit-activated switch, which causes a fixed exposure-duration to be established by the digital exposure-duration control system. A frequency divider is connected to the output of the clock-pulse-generating means, and the output of the frequency divider is connected, via the flash-unit-activated switch, to one input of a plural-input logic circuit, another input of which is connected to the output of the comparator. The frequency-division factor of the frequency divider has a value such that the period of the frequency-divided pulse train suffices for the longest exposure duration appropriate for hand-held camera operation, e.g., 1/30 of a second.

In order to assure that the camera shutter is closed within a time interval corresponding to the longest exposure duration possible for scene-light levels within a predetermined range of normal-operation values, use is made of a further such frequency divider. The further frequency divider produces a frequency-divided pulse train whose period corresponds to the longest exposure duration to be establishable by the exposure-duration control system. The output of this further frequency divider is connected to another input of the aforementioned plural-input logic circuit. The plural-input logic circuit may, for example, be essentially comprised of an OR-gate.

Advantageously, a gate is connected in the transmission path between the output of the clock-pulse-generating means and the frequency divider(s). This gate becomes enabled for transission of clock pulses to the frequency divider(s) at the start of an exposure.

For self-portrait exposures, a third frequency divider can be used, to delay the initiation of an exposure until the photographer has had time to position himself in front of the camera. The third frequency divider has an input connected to the output of the clock-pulse-generating means through the intermediary of a gate, and has an output connected to the exposure-initiating means of the camera, for example a shutter-opening magnet. The photographer can, for example, activate a self-portrait switch when a self-portrait exposure is to be performed, in order to enable the just-mentioned gate for transmission of clock pulses to the third frequency divider.

Advantageously, the analog-to-digital converter is provided with a set of storage flip-flops, each connected to one output of the converter for holding the value of the digital light-indicating signal. The clock inputs of the storage flip-flops are all connected to the output of the clock-pulse-generating means, for sample-and-hold operation.

In the preferred embodiment, the adder comprises a set of full adders interconnected by carry lines, a storage register which is preferably comprised of a set of master-slave flip-flops, and a time-delay stage. The inputs of the flip-flops of the storage register are connected to the outputs of the full adders. The clock-pulse inputs of the flip-flops of the storage register are connected to the output of the clock-pulse-generating means. The outputs of the flip-flops of the storage register are connected to the lines of the first input of the comparator and also, through the intermediary of the time-delay stage, to the addend inputs of the full adders, the augend inputs of which receive the digital light-indicating signal furnished by the analog-to-digital converter. Thus, during each individual summing operation of the ongoing totalization, the full adders receive at their augend inputs the constituent bits of the totalized-light signal and at their addend inputs the constituent bits of the current light-indicating signal, and produce at their outputs the constituent bits of the new value for the totalized-light signal, which then, during the next summing operation, is applied to the augend inputs of the full adders for use as the new augend. The use of the aforementioned time-delay stage assures that the totalizing operation just described proceeds unambiguously and with a reliable delay in the transfer of the value of the current totalized value.

Advantageously, the time-delay stage comprises a set of clocked flip-flops together forming a buffer or transfer storage, the clock-pulse inputs of the flip-flops being connected to the output of the clock-pulse-generating means, but through the intermediary of an inverter. In this way, the flip-flops of the (output) storage register of the totalizer are clocked by the positive-going flanks of the clock pulses, whereas the flip-flops of the (intermediate) buffer or transfer storage are clocked by the negative-going flanks of the clock pulses.

Performing the totalization of the values assumed by the digital light-indicating signal in synchronism with the train of clock pulses also yields the advantage that interference pulses, or the like, produced intermediate successive clock pulses, will have no effect upon the totalization.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
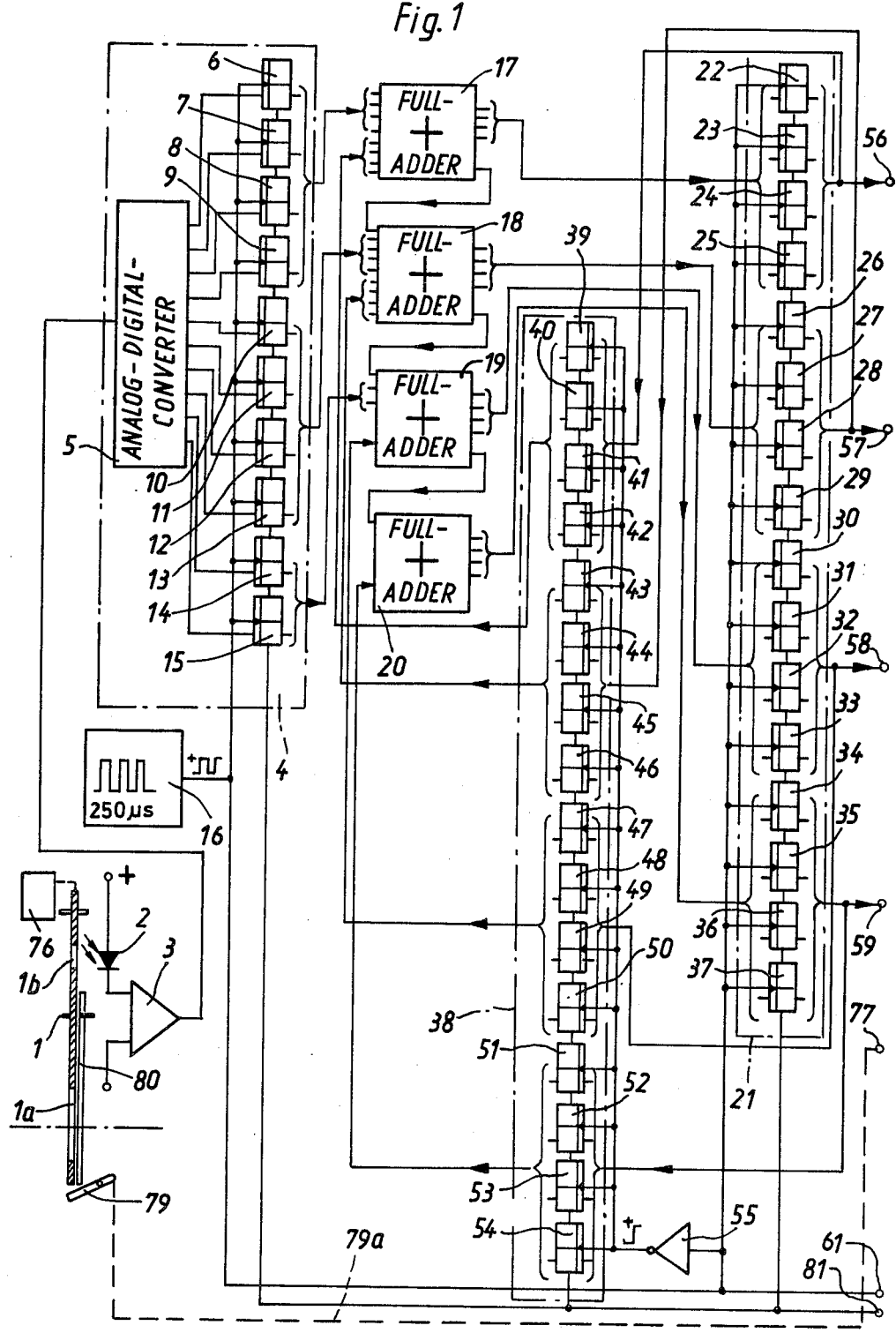
FIGS. 1 and 2 constitute the left and right halves of a circuit diagram depicting an exemplary embodiment of the invention.

As shown in FIG. 1, a shutter-opening element 1 is provided with an aperture 1b behind which is positioned a photosensitive element 2 connected to one input of an operational amplifier 3. The output of operational amplifier 3 is connected to a switching unit 4, comprising an analog-to-digital converter 5 and, connected to the outputs of the latter, RS master-slave flip-flops 6–15. The clock inputs of the individual RS flip-flops are connected to the output of a clock pulse generator 16. Pulse generator 16 produces a pulse train having a period of 250 microseconds.

Figure 2:
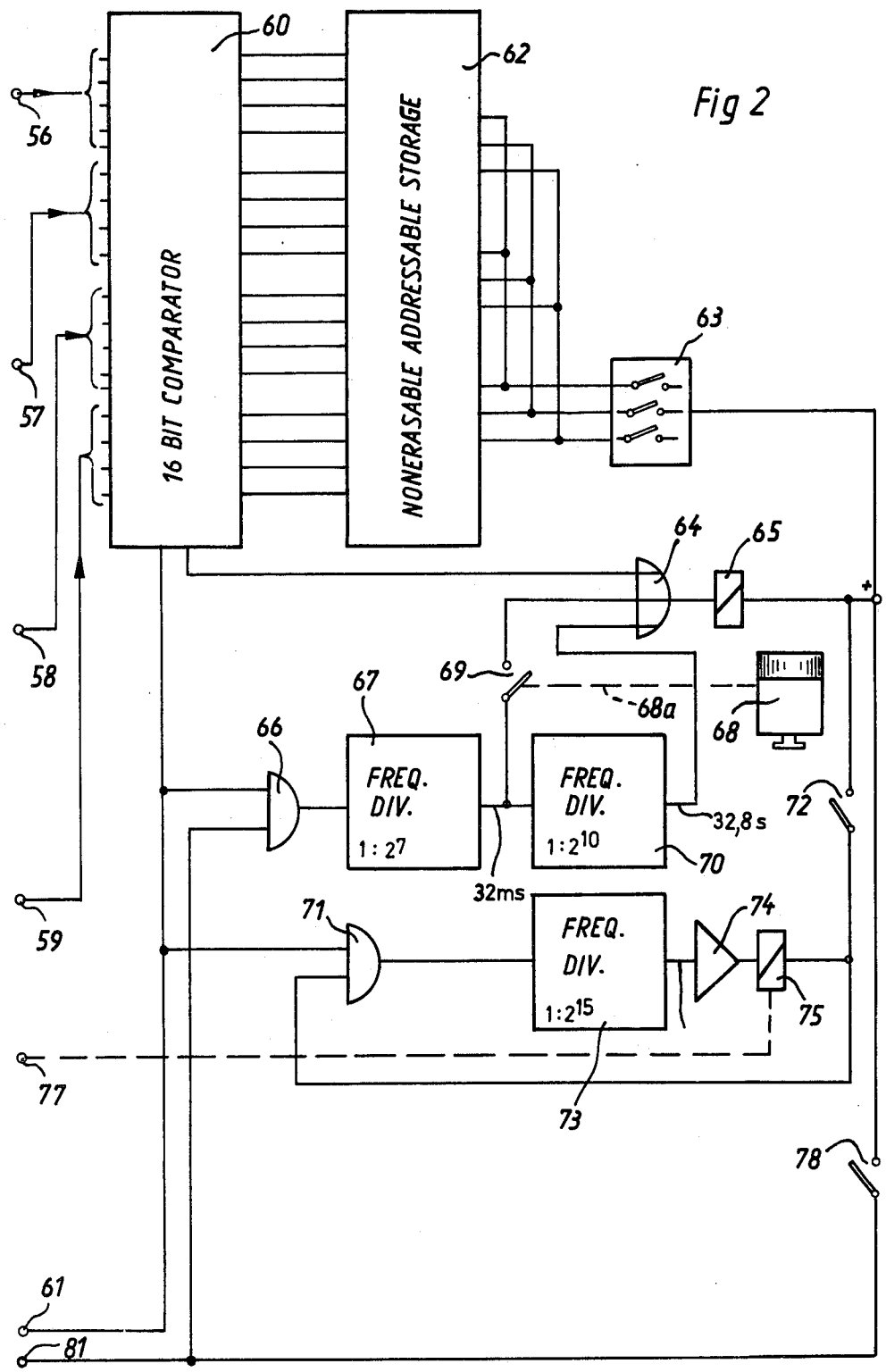

The start and reset inputs of the RS flip-flops are connectable, via connections 81 and a switch 78 (see FIG. 2) to the positive terminal (+) of a non-illustrated voltage source.

If the system is to be capable of being set to seven different aperture settings, the amplitude of the light-dependent current or voltage produced by photosensitive element 2 will vary between values standing at the ratio of 1:128. If it is desired to establish an amplitude resolution of 1:8 for the light-dependent signal, the amplitude of the signal will vary between values standing in the ratio of 1:1024. Accordingly, the analog-to-digital converter 5 utilized in the exemplary embodiment has a 10-bit capability.

The outputs of RS flip-flops 6–9 are connected to four inputs of a full adder 17. The outputs of RS flip-flops 10–13 are connected to four inputs of a full adder 18. The outputs of the two flip-flops 14 and 15 are connected to two inputs of a further full adder 19. A still further full adder is denoted by numeral 20. The individual full adders 17–20 are interconnected by carry lines.

A storage register 21 comprises sixteen RS master-slave flip-flops 22–37. The four outputs of full adder 17, of full adder 18, of full adder 19 and of full adder 20 are, respectively, connected to the four inputs of RS flip-flops 22–25, of RS flip-flops 26–29, of RS flip-flops 30–33 and of RS flip-flops 34–37. A start and reset connection leads from the storage register 21 to the switch 78. The individual clock inputs of the RS flip-flops 22-37 are connected to the output of clock pulse generator 16.

Additionally, a connection leads from the storage register 21 to a further storage register 38, which latter serves as time-delay stage operative for delaying information transfer within the totalizer of the exposure control system. This storage register comprises sixteen RS flip-flops 39-54. The outputs of flip-flops 22-25, 26-29, 30-33 and 34-37 are connected, respectively, to the corresponding inputs of flip-flops 39-42, 43-46, 47-50 and 51-54. The outputs of RS flip-flops 39-42, 43-46, 47-50 and 51-54 are connected, respectively, to four inputs of full adder 17, of full adder 18, of full adder 19 and of full adder 20. The clock inputs of RS flip-flops 39-54 are connected via an inverter 55, to the output of the clock pulse generator 16. The clock inputs of the RS flip-flops 22-37 of storage register 21 are directly connected to the output of pulse generator 16.

The RS flip-flops 22-37 of storage register 21 are clocked by the positive-going flanks of the clock pulses produced by pulse generator 16, whereas the RS flip-flops 39-54 of storage register 38 are clocked by the negative-going flanks of the clock pulses produced by pulse generator 16. The outputs of RS flip-flops 22-37 are connected, via connections 56-59, to corresponding inputs of a 16-bit comparator 60. For the sake of simplicity, only a single such connecting line is shown for each group of four RS flip-flops. The digital comparator 60 is furthermore connected, via connections 61, to the output of the clock pulse generator 16, for synchronized comparison.

The other inputs of comparator 60 are connected to the sixteen outputs of a nonerasable fixed-program storage 62. The address-signal inputs of storage 62 are connected to a program-selector addressing unit 63, by means of which the system is set for the sensitivity of the film being employed. Nonerasable fixed-program storage 62 stores signal combinations indicating what total amount of exposure light is required for different film sensitivities. Additionally, the values of signal combinations stored in the fixed-program storage 62 are inversely proportional to the period of the pulse train produced by clock pulse generator 16.

The output of comparator 60 is connected to the input of an OR-gate 64, whose output is connected to the shutter-closing magnet 65 of the shutter mechanism.

Extending from the junction 61, to which the output of the clock pulse generator 16 is connected, is a connection leading to one input of an AND-gate 66, the other input of which is connected to the start switch 78. The output of AND-gate 66 is connected, via a frequency divider 67 and a flash-unit-activated switch 69, to a further input of the OR-gate 64. The frequency-division factor of frequency divider 67 is 128. Accordingly, the period of the pulse train produced at the output of frequency divider 67 is 32 milliseconds.

The output of frequency divider 67 is connected to the input of a further frequency divider 70, whose output is connected to the third input of OR-gate 64. The frequency-divider factor of frequency divider 70 is 1024. Accordingly, the period of the pulse train produced at the output of frequency divider 70 is 32.8 seconds.

The output of clock pulse generator 16 is furthermore connected, via connections 61, to one input of an AND-gate 71, whose other input is connectable by means of a start switch 72 to the positive terminal (+) of the voltage source. The output of AND-gate 71 is connected to the input of a third frequency divider 73, whose frequency-divider factor is $2^{15}$. Accordingly, the period of the pulse train produced at the output of frequency divider 73 is 8.2 seconds. The output of frequency divider 73 is connected, via an amplifier 74, to the shutter-opening magnet of the shutter mechanism.

The operation of the exemplary embodiment is as follows:

It is here assumed that the photosensitive element 2 is located behind a shutter-opening element 1 whose operation is subjected to the influence of a braking mechanism 76. The configuration of shutter opening 1a is matched to that of the aperture 1b in front of the photosensitive element 2, i.e., so that the variation in the light incident on element 2 as the shutter is opening and closing matches the variation in the light incident upon the film in the camera. At the start of the opening motion of the shutter mechanism, the start switch 78 is closed. This readies the RS flip-flops 6-15, 22-37 and 39-54.

During the opening motion of the shutter element 1, the digital signals appearing at the outputs of the RS flip-flops 6-15 at intervals of 250 microseconds are counted up in the full adders 17-19 and added to the sum being fed back from the storage register 38. When comparator 60 detects that its input digital signals are equal in value to the signals from fixed-program storage 62, a digital signal is transmitted to the OR-gate 64, and the hitherto energized shutter-closing magnet becomes deenergized. In non-illustrated, and per se conventional manner, the shutter-closing element 80 is released and closes the shutter opening.

If the flash unit 68 is mounted on the camera, a mechanical linkage 68a causes switch 69 to close. After a delay of at most 32 milliseconds, a voltage signal is transmitted from frequency divider 67 to OR-gate 64, so that the shutter-closing magnet 65 will become deenergized, at the latest, upon elapse of this time interval.

If the scene-light level is low, then the OR-gate 64 receives a voltage signal from the frequency divider 70, at the latest, after elapse of 32.8 seconds, and the magnet 65 becomes deenergized, i.e., if a voltage signal has not already been transmitted to OR-gate 64 from the comparator 60.

If self-portrait shots are to be taken, the user closes switch 72. This enables the AND-gate 71 for transmission of signals. The shutter-opening magnet 75, already energized due to the closing of switch 72, becomes deenergized by means of the frequency divider 73, after the elapse of 8.2 seconds. As a result, the mechanical linkage 79a, 79 releases the shutter-opening element 1.

It will be understood that each of the elements described above, or two or more together, may also find a useful application in other types of circuits differing from the types described above.

While the invention has been illustrated and described as embodied in a photographic camera settable for different film sensitivities, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential charcteristics of the generic or specific aspects of this invention.

What is claimed as new and desired to be protected by Letters Patent is set forth in the appended claims.

1. In a photographic camera provided with a shutter, an exposure-duration control system which comprises, in combination, light-sensitive means operative for generating an analog signal whose value is indicative of the intensity of scene light; analog-to-digital converter means operative for receiving the analog signal and converting the analog signal into a digital signal of corresponding value; clock-pulse-generating means operative for generating a train of clock pulses, the repetition frequency of the train of clock pulses being greater than the reciprocal of the shortest exposure duration establishable by the exposure-duration control system; clocked digital totalizing means connected to the clock-pulse-generating means for receipt of the clock pulses and connected to the analog-to-digital converter means for receipt of the digital light-indicating signal and operative during the course of an exposure and in synchronism with the clock pulses for continually totalizing the values assumed by the digital light-indicating signal, to produce during the course of an exposure a digital totalized-light signal; comparator means having a first input and a second input and operative for producing an output signal when the values of the signals applied to the first and second inputs correspond, the first input being connected to receive the digital totalized-light signal; addressable storage means having an output connected to the second input of the comparator means and operative in response to receipt of address signals of different values for applying to the second input of the comparator means total-light-required signals of different respective values for different exposure-duration control programs, the value of each total-light-required signal corresponding to the value which the digital totalized-light signal assumes when the total amount of light incident upon the film in the camera reaches the value required for the respective exposure-duration control program; program-selector means operative for applying to the addressable storage means address signals of different respective values; and exposure-terminating means connected to receive the comparator output signal and operative for generating a terminate-exposure signal in dependence upon at least the comparator output signal.

2. In a photographic camera as defined in claim 1, further including frequency-divider means connected to receive the clock pulse train and operative for producing at its output a frequency-divided pulse train, a flash-unit-activated switch connecting the exposure-terminating means to the output of the frequency-divider means, the exposure-terminating means comprising means operative for producing a terminate-exposure signal in response to an output pulse from the frequency-divider means, the frequency division factor introduced by the frequency-divider means having a value such that the period of the frequency-divided pulse train predetermines the longest exposure duration establishable by the exposure-duration control system for hand-held operation of the photographic camera.

3. In a photographic camera as defined in claim 2, the period of the frequency-divided pulse train being on the order of magnitude of tens of milliseconds.

4. In a photographic camera as defined in claim 2, additionally including further frequency-divider means connected between the clock-pulse-generating means and the exposure-terminating means and operative for producing a further frequency-divided pulse train whose period is longer than that of the first frequency-divided pulse train, the period of the further frequency-divided pulse train predetermining the longest exposure duration establishable by the exposure-duration control system.

5. In a photographic camera as defined in claim 4, the period of the first frequency-divided pulse train being on the order of magnitude of tens of milliseconds, the period of the second frequency-divided pulse train being on the order of magnitude of tens of seconds.

6. In a photographic camera as defined in claim 1, further including frequency-divider means connected between the clock-pulse-generating means and the exposure-terminating means and operative for producing a frequency-divided pulse train, the exposure-terminating means comprising means operative for producing a terminate-exposure signal in response to an output pulse from the frequency-divider means, the period of the frequency-divided pulse train predetermining the longest exposure duration establishable by the exposure-duration control system.

7. In a photographic camera as defined in claim 2, further including a gate connecting the output of the clock-pulse-generating means to the input of the frequency-divider means and means for enabling the gate for clock-input transmission at the start of an exposure.

8. In a photographic camera as defined in claim 6, further including a gate connecting the output of the clock-pulse-generating means to the input of the frequency-divider means and means for enabling the gate for clock-pulse transmission at the start of an exposure.

9. In a photographic camera as defined in claim 6, the exposure-terminating means including an OR-gate having an input connected to the output of the comparator means and an input connected to the output of the frequency-divider means.

10. In a photographic camera as defined in claim 1, further including frequency-divider means connected to receive the clock pulse train and operative for producing at its output a frequency-divided pulse train, further including exposure-initiating means connected to the output of the frequency-divider means and operative in response to an output pulse from the frequency-divider means for initiating an exposure, a gate connected in the clock-pulse transmission path between the output of the clock-pulse-generating means and the frequency-divider means, and self-portrait switch means activatable by the photographer for the performance of a self-portrait exposure and operative when activated for enabling the gate for clock-pulse transmission, the period of the frequency-divided pulse train predetermining the time interval which elapses between activation of the self-portrait switch means and the initiation of an exposure.

11. In a photographic camera as defined in claim 1, the analog-to-digital converter means being operative for converting the analog light-indicating signal into an n-bit digital signal, the analog-to-digital converter means including n-clocked storage flip-flops, each storage flip-flop being connected to register when clocked a respective one of the n bits of the digital light-indicating signal, the clock inputs of the n clocked storage flip-flops being connected to the output of the clock-pulse-generating means.

12. In a photographic camera as defined in claim 11, the totalizing means including an adder comprised of a set of full adders interconnected by carry lines, the adder having an input connected to receive the digital light-indicating signal, a clocked storage register comprised of a set of bistable storage devices, the clocked storage register having an input connected to the output of the adder, a clock-pulse input connected to the output of the clock-pulse-generating means, and an output connected to the first input of the comparator means, and time-delay means connecting the output of the storage register to the input of the adder for transmitting the digital signal registered by the storage register to the adder.

13. In a photographic camera as defined in claim 12, the time-delay means comprising a clocked buffer storage comprising a set of clocked flip-flops and an inverter, the inverter connecting the clock-pulse inputs of the clocked flip-flops to the output of the clock-pulse-generating means.